Benjamin F. Tatem's Game & Rat Trap.
No. 120,683.  Patented Nov. 7, 1871.
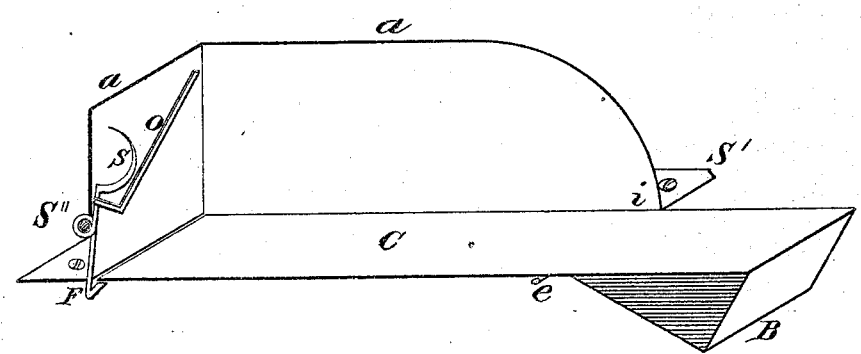
Witnesses.
John E. Finley
S. G. Dodge
Inventor:
Benj.n F. Tatem

UNITED STATES PATENT OFFICE.

BENJAMIN F. TATEM, OF MEMPHIS, TENNESSEE.

IMPROVEMENT IN GAME AND RAT-TRAPS.

Specification forming part of Letters Patent No. 120,683, dated November 7, 1871.

*To all whom it may concern:*

Be it known that I, BENJAMIN F. TATEM, of the city of Memphis, county of Shelby and State of Tennessee, have invented certain Improvements in Game and Rat-Traps, of which the following is a specification:

The nature and object of my invention is so to construct a trap with a false floor that it may be set upon any box or barrel or over a pit, confined by lugs $s'$ and $s''$, in which the animal is to be caught, reference being made to the accompanying drawing—

Figure 1 being a perspective view, in which—

$a\ a$ represents the body of the trap; $c$, the false floor, working on a wire hinge, $e$, which runs through the sides of the trap at $i$. F is a trigger, holding the trap-door in position, controlled by the wire spring $o$. B is a weight of such dimensions as to more than counterbalance that portion of the trap-floor on the opposite side of the wire pivot, $e$ so that when the floor $c$ is forced down beneath the weight of the animal, the trigger F having been thrown by its pulling the bait on the curved hook $s$, it will be lifted by the falling of the weight B and forced back in the trigger F, thus setting itself every time as soon as the animal falls into whatever is placed to receive it; thus perfecting a trap, which is simple, durable, self-setting, and cheap for the purpose of catching animals of any description.

I claim as my invention—

The combination of these several parts, arranged and operated substantially as and for the purpose hereinbefore set forth.

BENJN. F. TATEM.

Witnesses:
JOHN E. FINLEY,
S. G. DODGE.

(143)